(12) United States Patent
Talou et al.

(10) Patent No.: US 10,407,857 B2
(45) Date of Patent: Sep. 10, 2019

(54) SNOW-CLEARING ASSEMBLY AND ASSOCIATED DEVICES

(71) Applicant: PIM, Pusignan (FR)

(72) Inventors: Pierre Talou, Cremieu (FR); Christophe Ray, Chozeau (FR); Renaud Baesa, Villette d'Anton (FR); Patrick Mondesir, Balan (FR); Raphael D'Agostini, Dagneux (FR)

(73) Assignee: PIM, Pusignan (FR)

( * ) Notice: Subject to any disclaimer, the term of this patent is extended or adjusted under 35 U.S.C. 154(b) by 0 days.

(21) Appl. No.: 15/741,502

(22) PCT Filed: Jul. 20, 2016

(86) PCT No.: PCT/FR2016/051864
§ 371 (c)(1),
(2) Date: Jan. 2, 2018

(87) PCT Pub. No.: WO2017/017347
PCT Pub. Date: Feb. 2, 2017

(65) Prior Publication Data
US 2018/0202119 A1    Jul. 19, 2018

(30) Foreign Application Priority Data

Jul. 24, 2015 (FR) ...................................... 15 57114

(51) Int. Cl.
*E01H 5/06* (2006.01)
*F16B 5/06* (2006.01)

(52) U.S. Cl.
CPC ........... *E01H 5/061* (2013.01); *F16B 5/0642* (2013.01); *F16B 5/0685* (2013.01); *F16B 2005/0678* (2013.01)

(58) Field of Classification Search
CPC ........... E01H 5/06; E01H 5/061; E01H 5/062; E01H 5/066; F16B 5/0642; F16B 5/0685
(Continued)

(56) References Cited

U.S. PATENT DOCUMENTS 3,772,803 A * 11/1973 Cote ...................... E01H 5/062
172/701.3
4,058,173 A 11/1977 Carson
(Continued)

FOREIGN PATENT DOCUMENTS

CA     2172853 A1    9/1997
KR  101158262 B1    6/2012

OTHER PUBLICATIONS

International Search Report dated Oct. 28, 2016 re: Application No. PCT/FR2016/051864; pp. 1-2; citing: US 2006/070264 A1, US 4 058 173 A, CA 2 172 853 A1 and KR 101 158 262 B1.

*Primary Examiner* — Robert E Pezzuto
(74) *Attorney, Agent, or Firm* — Cantor Colburn LLP

(57) ABSTRACT

A connecting member for a snow-removal set having a snow-removal blade and a snow-removal scraper, the connecting member being configured to be fastened to the snow-removal blade and to cooperate with the snow-removal scraper, the connecting member including at least one fastening portion configured to be fastened directly or indirectly on the snow-removal blade, a receiving portion configured to cooperate with a complementary connecting member formed on the snow-removal scraper, and a locking portion including at least one locking element configured to lock the connecting member between the snow-removal scraper and the snow-removal blade, where the locking element includes a bearing portion extending in the receiving portion of the connecting member, the bearing portion being configured to exert a force on the complementary (Continued)

member of the snow-removal scraper in a mounted locked position.

7 Claims, 10 Drawing Sheets

(58) Field of Classification Search
USPC .............. 37/232, 233, 266, 272, 279, 231; 172/701.3, 706, 264
See application file for complete search history.

(56) References Cited

U.S. PATENT DOCUMENTS

| | | | |
|---|---|---|---|
| 7,467,485 B2 * | 12/2008 | Lachance | ............... E01H 5/062 172/264 |
| 2003/0221338 A1 * | 12/2003 | Verseef | .................. E01H 5/062 37/266 |
| 2006/0070264 A1 | 4/2006 | Lachance et al. | |

* cited by examiner

SNOW-CLEARING ASSEMBLY AND ASSOCIATED DEVICES

TECHNICAL FIELD

The invention concerns the field of snow-removal machines and more particularly the accessories such as a scraper mounted on snow-removal blades.

BACKGROUND

In general, each scraper model is dedicated to a snow type (crusted, melting, powdery, transformed, etc.). Furthermore, the models of snowplows vary depending on the type of scraper that equips them, which multiplies the number of machines for snow-removing.

The set-up and the deposit of a scraper is carried out, in a known manner, directly on the snow-removal blade by screwing along the entire length of the snow-removal blade. The assembly of the snow-removal scraper on the snow-removal blade is tedious because the dimensions of the scraper are significant, which requires at least two persons for the mounting.

Numerous manufacturers of scrapers have been interested in the materials used for the scraper or in the shape of the latter, yet without finding a solution to the aforementioned drawbacks.

BRIEF SUMMARY

The invention aims at solving all or part of the aforementioned drawbacks.

The invention provides a connecting member for a snow-removal set, said snow-removal set comprising at least one snow-removal blade and one snow-removal scraper, said connecting member being configured to be fastened to the snow-removal blade of the set and to cooperate with the snow-removal scraper, said connecting member comprising at least one fastening portion configured to be fastened directly or indirectly on the snow-removal blade, at least one receiving portion configured to cooperate with a complementary connecting member formed on the snow-removal scraper.

Thus, the connecting member acts as an interface between the snow-removal blade and the snow-removal scraper so that it is easier to position and remove the scraper without having to dismount the entire set.

According to a feature of the invention, the connecting member comprises at least one locking portion comprising at least one locking element configured to lock the connecting member between the snow-removal scraper and the snow-removal blade. The locking device allows securing the scraper on the blade.

According to a feature of the invention, the locking of the connecting member is not permanent, which allows unlocking the scraper easily.

According to a feature of the invention, the locking element comprising at least one bearing portion extending at least partially in the receiving portion of the connecting member, said bearing portion of the locking element being configured to exert a force on the complementary member of the snow-removal scraper in the mounted/locked position.

Thanks to this configuration, the snow-removal scraper, in the mounted/locked position is blocked in translation.

According to a feature of the invention, the bearing portion of the locking element is shaped to cooperate by form fitting with the complementary member of the snow-removal scraper in the mounted/locked position.

According to a feature of the invention, the locking element comprises an actuation portion configured to enable the axial displacement of the bearing portion in order to lock or unlock the connecting member.

Preferably, the bearing portion is displaced according to a direction substantially perpendicular to the direction in which extends the complementary connecting member of the snow-removal scraper in the receiving portion, in the mounted/unlocked position and/or in the mounted/locked position.

According to a feature of the invention, the receiving portion comprises a housing shaped to receive at least partially the complementary connecting member of the snow-removal scraper in the mounted/locked position or in the mounted/unlocked position.

According to a feature of the invention, the housing has a shape complementary to that of the complementary connecting member of the snow-removal scraper, which allows better retaining of the snow-removal scraper in the connecting member in the mounted/unlocked position.

According to a feature of the invention, the complementary connecting member is positioned in the housing of the receiving portion by sliding, which allows a simple and rapid set-up of the snow-removal scraper in the connecting member.

According to a feature of the invention, the receiving portion is formed at least partially by a spring leaf.

According to a feature of the invention, the receiving portion is formed of one-piece part.

Alternatively, the receiving portion is formed into several parts fastened to each other to form the receiving portion and contribute, or not, to the formation of the housing of the receiving portion.

According to a feature of the invention, the receiving portion is formed into at least two portions, a rotatably movable first portion mounted on a fixed second portion.

According to a feature of the invention, an opening is formed in the receiving portion; the opening opens into the housing and is shaped to enable the passage, at least partially, of the locking element.

According to a feature of the invention, the connecting member comprises a wedging portion configured to enable the change of inclination of the snow-removal scraper according to the type of the snow-removal blade.

Advantageously, the wedging portion is positioned between the fastening portion of the connecting member and the snow-removal blade in the mounted/locked position and/or in the mounted/unlocked position.

According to a feature of the invention, the wedging portion comprises an inclined side whose inclination is predetermined according to the inclination of the snow-removal blade.

According to a feature of the invention, the wedging portion and the fastening portion are made integrally and form one single part.

The invention further concerns a snow-removal scraper for a snow-removal set comprising at least one scraping portion, at least one fastening portion, the fastening portion comprising a complementary connecting member shaped so as to cooperate with the receiving portion of the connecting member according to the invention.

According to a feature of the invention, the complementary connecting member comprises a cooperation face shaped to cooperate with the bearing portion of the locking portion of the connecting member, in the mounted/locked position.

According to a feature of the invention, the cooperation face of the complementary connecting member has a relief.

In other words, according to a feature of the invention, the complementary connecting member is shaped like a rack.

According to a feature of the invention, the bearing portion has a relief complementary to the relief formed on the cooperation face of the complementary connecting member. Preferably, the relief of the bearing portion is crenelated.

According to a feature of the invention, the complementary connecting member has an H-shaped or reverse T-shaped or I-shaped or reverse J-shaped cross-section. Advantageously, the housing of the receiving portion of the connecting member has a shape complementary to the shape of the complementary connecting member.

According to a feature of the invention, the snow-removal scraper comprises an intermediate portion connecting the fastening portion to the scraping portion.

Alternatively or complementarily to the wedging portion of the connecting member, the intermediate portion is straight or arranged in an angular manner.

The invention also provides a device for connecting a snow-removal scraper to a snow-removal blade of a snow-removal set, the connecting device comprising:
 at least one connecting member configured to be fastened to the snow-removal blade of the snow-removal set, said connecting member comprising at least one fastening portion configured to be fastened directly or indirectly on the snow-removal blade,
 at least one complementary connecting member configured to be formed on the snow-removal scraper of the snow-removal set,
said connecting member comprising a receiving portion shaped to cooperate with a portion of the complementary connecting member so that the snow-removal blade and the snow-removal scraper are mechanically connected to each other.

Thus, thanks to the connecting device, which acts as an interface between the snow-removal blade and the snow-removal scraper, it is possible to rapidly and easily adapt any type of scraper equipped with a complementary connecting member to the snow-removal blade. This close adaptation to the snow type allows scraping better and using less road salt (chemical snow-removal solution) downstream of the mechanical snow-removal.

Furthermore, such a configuration allows changing the snow-removal scraper without any tool since said scraper is not fixedly fastened on the snow-removal blade. Indeed, thanks to the configuration of the complementary connecting member and of the connecting member and thanks to their reversible cooperation, the set-up and the deposit of a snow-removal scraper may be easily completed without any tool.

Advantageously, the connecting device comprises a plurality of connecting members configured to be positioned in spaced manner on the snow-removal blade.

According to a feature of the invention, the connecting members of the plurality being configured to receive the same complementary connecting member or at least one portion of the connecting members of the plurality being configured to receive a first complementary connecting member of a first snow-removal scraper and at least another portion of the connecting members of the plurality being configured to receive a second complementary connecting member of a second snow-removal scraper.

Advantageously, the number of connecting members may be variable and adapted according to the configuration of the snow-removal blade on which said connecting members are configured to be fastened and/or according to the dimensions and the configuration of the snow-removal scrapers to be received.

In another embodiment the invention is a snow-removal set, comprising:
 at least one snow-removal blade,
 at least one snow-removal scraper according to the invention,
 at least one connecting device according to the invention,
 the connecting device being configured to releasably connect the snow-removal scraper to the snow-removal blade and to be positioned between the snow-removal blade and the snow-removal scraper.

In the present application, mounted/unlocked position means a position in which the connecting member is mounted on the snow-removal blade and receives the snow-removal scraper there within but in which the locking member is not installed or not actuated or in which the bearing portion of the locking portion of the connecting member does not exert any force on the snow-removal scraper.

In the present application, mounted/locked position means a position in which the connecting member is mounted on the snow-removal blade and receives the snow-removal scraper therewithin but in which the locking member is installed or actuated and in which the bearing portion of the locking portion of the connecting member exerts a force on the snow-removal scraper.

According to a feature of the invention, the snow-removal set comprises a plurality of scrapers.

According to a feature of the invention, the scrapers are mounted aligned against each other and are arranged to be supported by the same snow-removal blade.

BRIEF DESCRIPTION OF THE DRAWINGS

The invention will be better understood, thanks to the description hereinafter, which relates to embodiments according to the present invention, given as non-limiting examples and explained with reference to the appended schematic drawings, in which.

DETAILED DESCRIPTION

Figure 1:
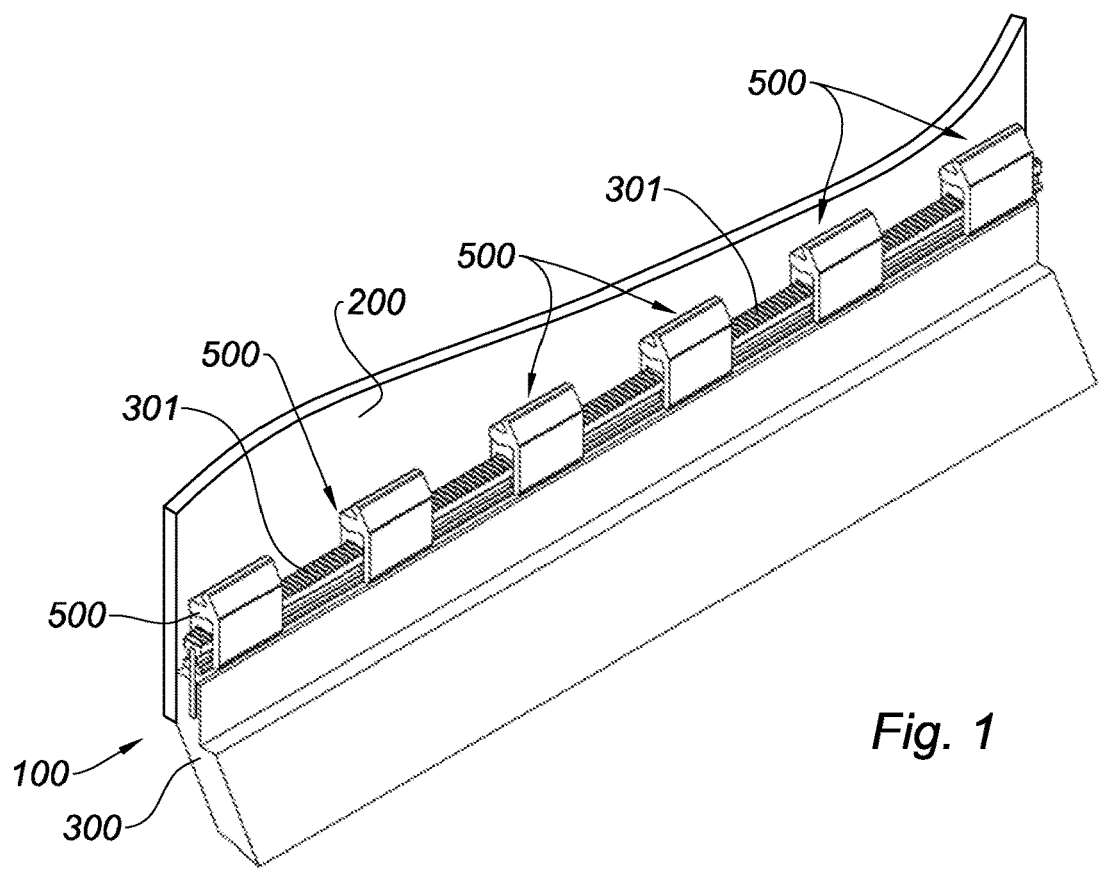
FIG. 1 is a partial front perspective view of a snow-removal set according to the invention comprising a connecting member according to the invention and according to a first embodiment.
Figure 2:
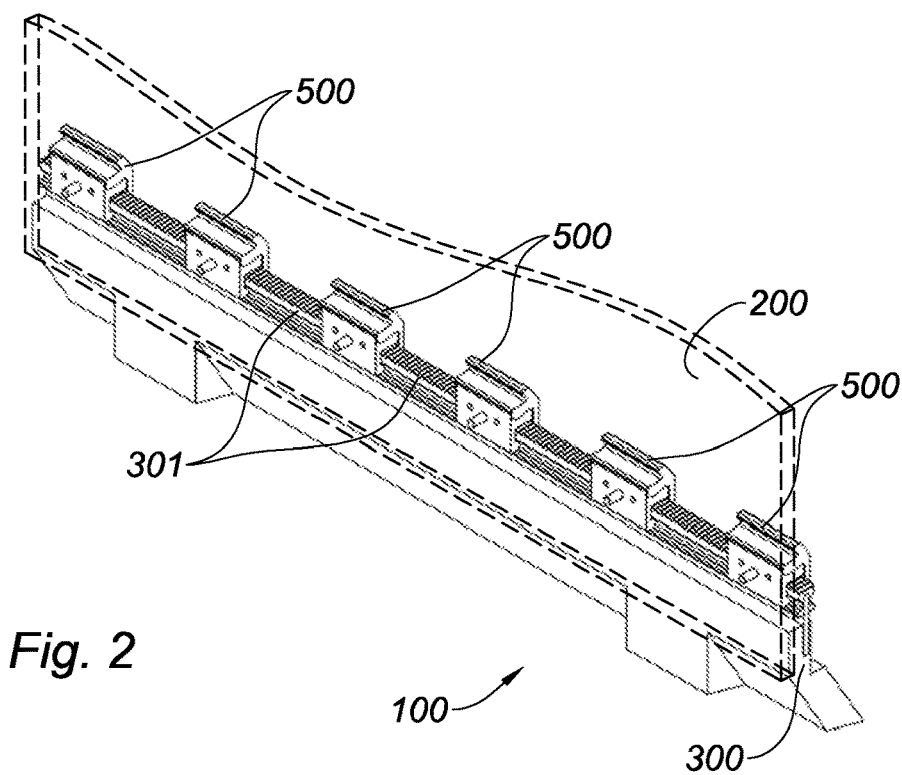
FIG. 2 is a partial rear perspective view of the set represented in FIG. 1, FIGS. 3 and 4 are exploded views of the connecting member according to the invention according to the first embodiment.

The snow-removal set 100 according to the invention illustrated in FIGS. 1 and 2 comprises a snow-removal blade 200 on which is indirectly mounted a snow-removal scraper 300. The snow-removal set further comprises a connecting device forming an interface between the snow-removal blade 200 and the snow-removal scraper 300. The connecting device is configured to releasably connect the snow-removal scraper 300 to the snow-removal blade 200 and is positioned between the snow-removal blade 200 and the snow-removal scraper 300, as illustrated in particular in FIG. 1.

The connecting device comprises a connecting member 500 fastened on the one hand to the snow-removal blade 200 and connected to the snow-removal scraper 300 on the other hand. The connecting device further comprises a complementary connecting member 301 formed on the snow-removal scraper 300 and shaped so as to cooperate with the connecting member 500.

The connecting member 500 according to the invention and according to a first embodiment will now be described with reference to FIGS. 3 to 13.

Figure 3:
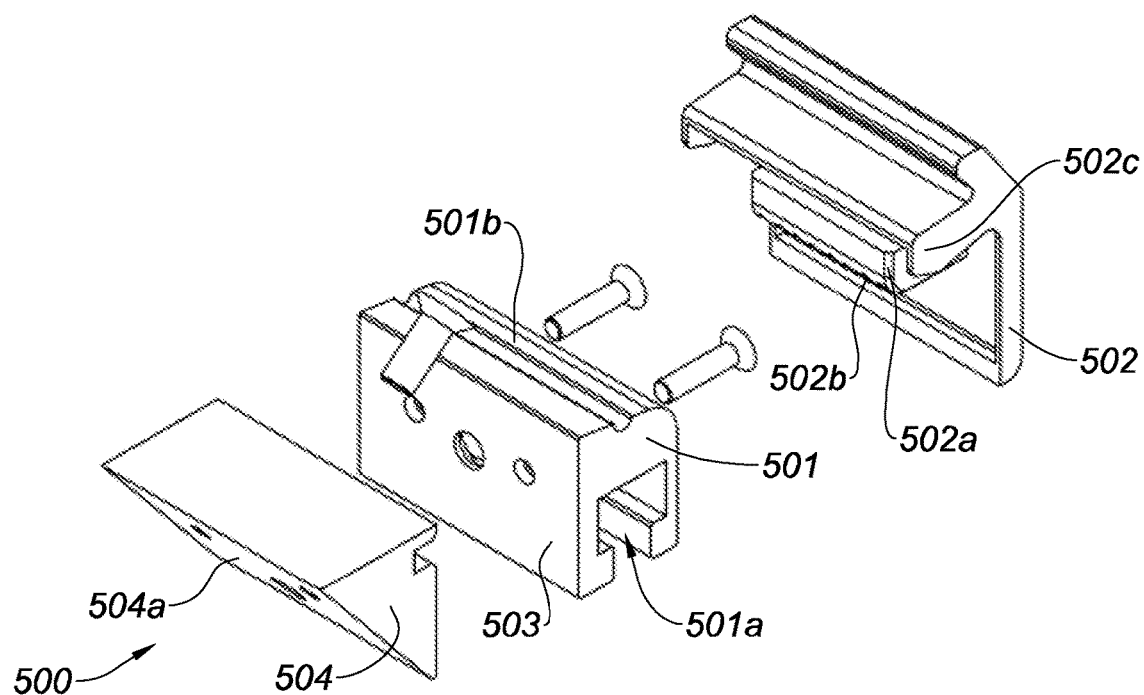
Figure 4:
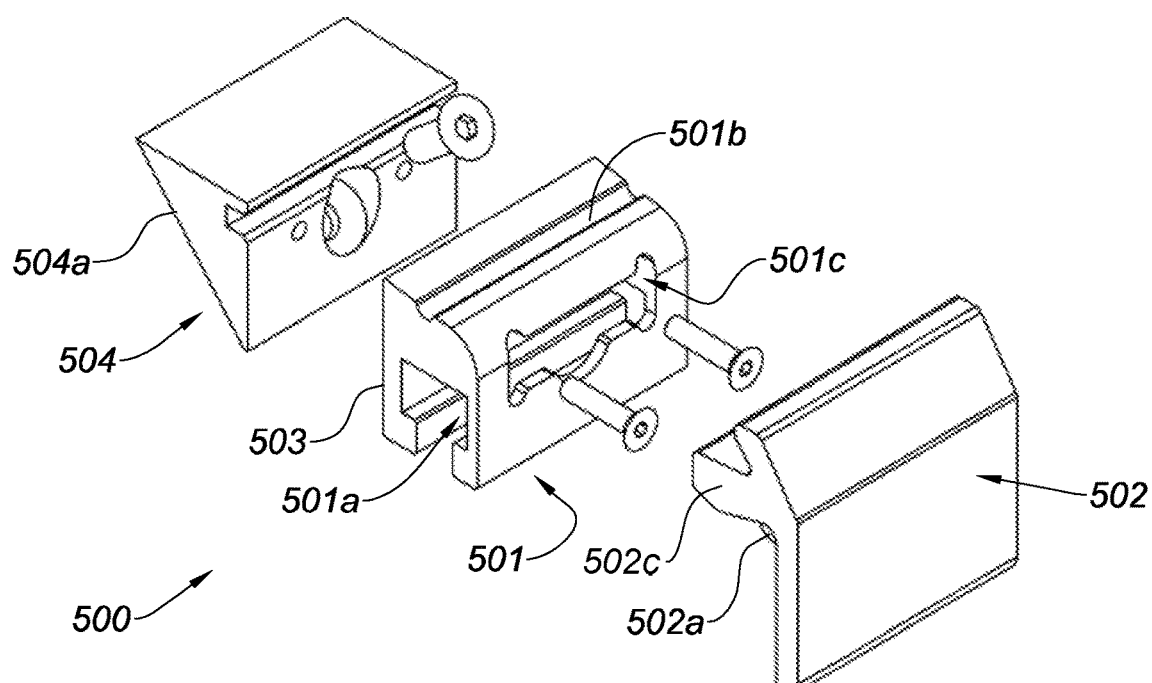

Referring to FIGS. 3 and 4, the connecting member 500 comprises a receiving portion 501 configured to cooperate with the complementary connecting member 301 formed on the snow-removal scraper 300. The connecting member 500 further comprises a fastening portion 503 contiguous to the receiving portion 501. The connecting member 500 comprises a locking portion 502 and an optional wedging portion 504.

Figure 5:
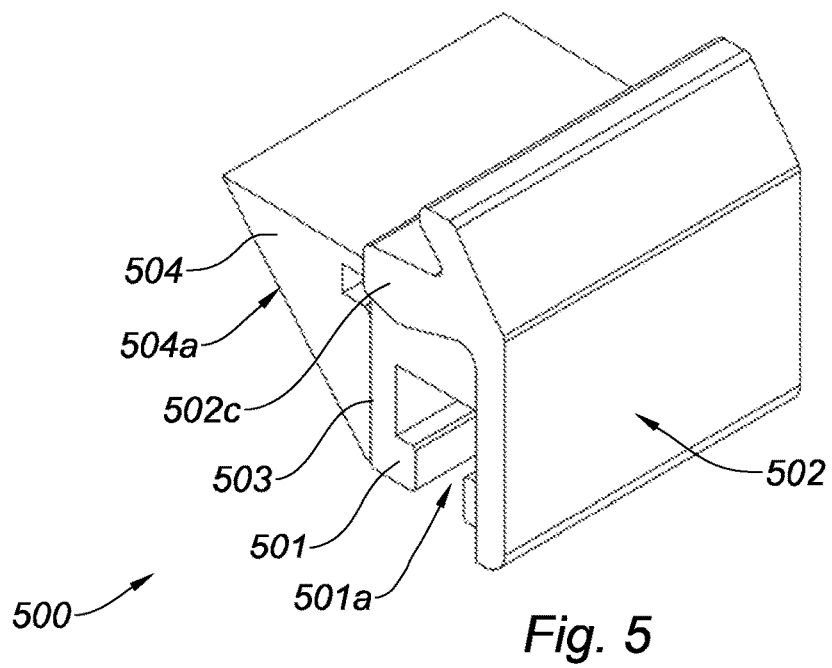
FIG. 5 is a perspective view of the connecting member according to the invention according to the first embodiment.
Figure 6:
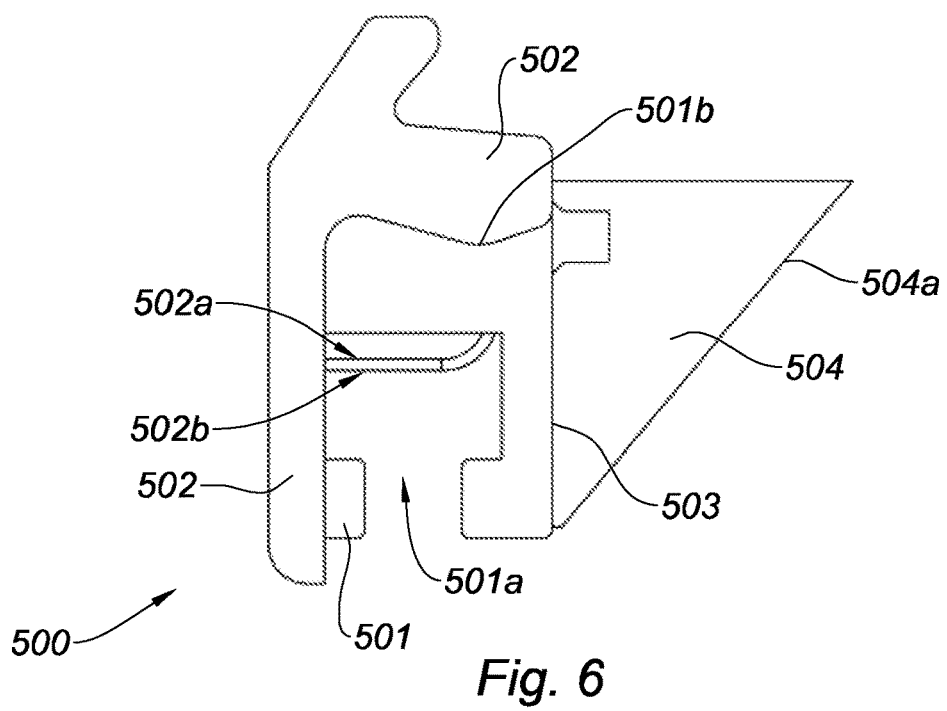
FIG. 6 is a side view of the connecting member according to the invention according to the first embodiment.

In the first embodiment of the connecting member 500, the locking 502, receiving 501 and wedging 504 portions comprise parts attached and fastened to each other to form the connecting member 500. Thus, the locking portion 502 is fastened laterally to the receiving portion 501 and the wedging portion 504 is set laterally against the fastening portion 503 formed on the receiving portion on the side opposite to the locking portion. As illustrated in FIGS. 5 and 6, the wedging portion 504 covers the fastening portion 503.

Each part 501, 502, 503, 504 of the connecting member 500 according to the first embodiment will now be described in detail with reference to FIGS. 7 to 13.

Figure 7:
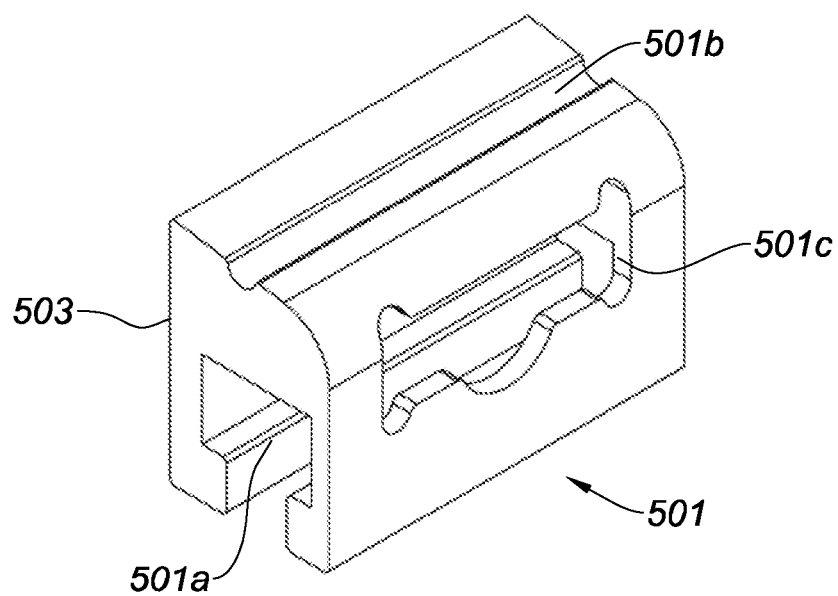
FIGS. 7 and 8 are perspective views of the receiving portion of the connecting member according to the invention and according to the first embodiment.
Figure 8:
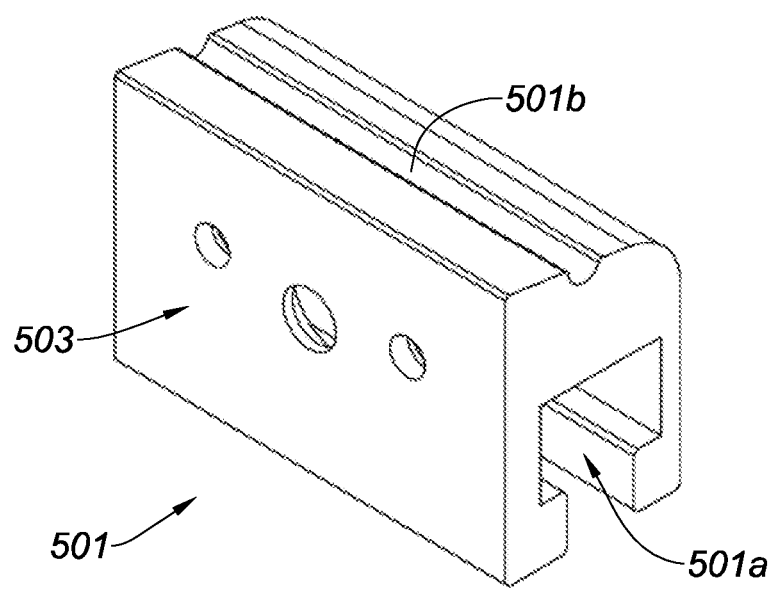

Referring to FIGS. 7 and 8, the receiving portion 501 comprises a housing 501a shaped to receive at least partially the complementary connecting member 301 of the snow-removal scraper 300. In the example illustrated in FIGS. 7 and 8, the housing 501a extends longitudinally through the receiving portion 501. The receiving portion 501 further comprises a groove 501b configured to receive a portion of the locking portion 502. The receiving portion 501 further comprises an opening 501c formed laterally, the opening 501c opens into the housing 501a of the receiving portion 501. The opening 501c is shaped to receive a bearing portion 502b of the locking portion 502.

As shown in FIG. 8, the fastening portion 503 is formed on one face of the receiving portion 501. In the first embodiment of the connecting member 500, the fastening portion 503 is configured to be fastened indirectly on the snow-removal blade 200. The fastening portion 503 comprises at least one fastening orifice. The connecting member 500 is configured to be fastened on the snow-removal blade 200, for example by screwing.

Figure 9:
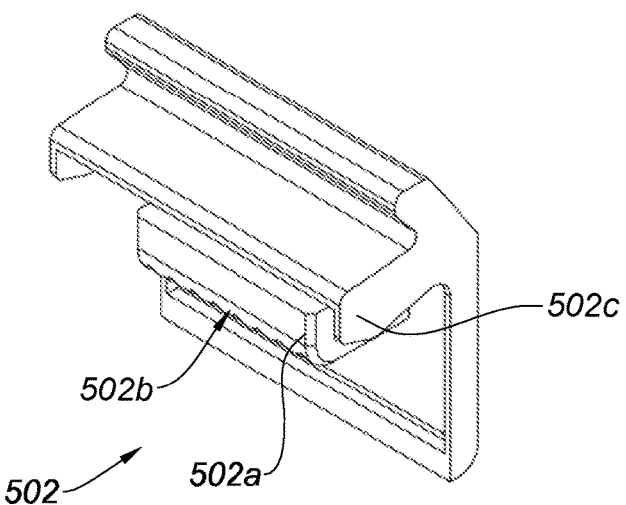
FIGS. 9 to 11 are perspective views of the locking portion of the connecting member according to the invention and according to the first embodiment.
Figure 10:
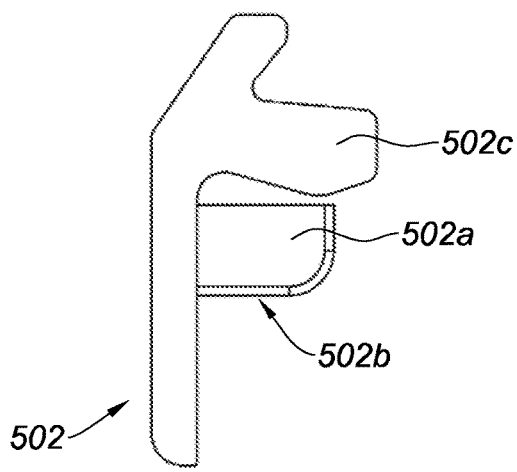
Figure 11:
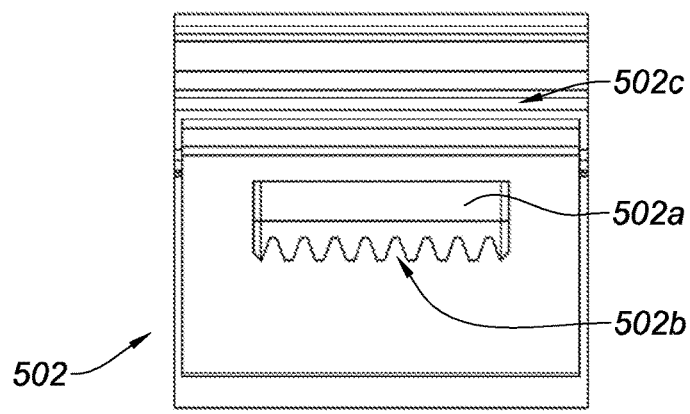

Referring to FIGS. 9 to 11, the locking portion 502 of the connecting member 500 comprises a locking element 502a configured to lock the connecting member 500 between the snow-removal scraper 300 and the snow-removal blade 200.

The locking element 502a extends according to an axis substantially perpendicular to the axis along which extends the housing 501a of the receiving portion 501. The locking element 502a is configured to be inserted into the opening 501c of the receiving portion 501 as illustrated in FIG. 6 for example.

As shown in particular in FIG. 6, the locking element 502a comprises a bearing portion 502b extending at least partially in the receiving portion 501 of the connecting member 500 and more specifically in the housing 501a of the receiving portion 501. The bearing portion 502b is configured to exert a force on the complementary member 301 of the snow-removal scraper in the mounted/locked position so as to block in translation the snow-removal scraper 300.

In the example illustrated in FIG. 11, the bearing portion 502b has a crenellated relief shaped so as to cooperate by form-fitting with the complementary member 301 of the snow-removal scraper 300 in the mounted/locked position.

The locking portion 502 comprises a protruding portion 502c extending along the same direction as the locking element 502a. The protruding portion 502c is shaped so as to be positioned on the receiving portion 501 and to coincide with the wedging groove 501b formed on the receiving portion 501, which allows maintaining the cooperation of the locking portion 502 with the receiving portion 501.

Figure 12:
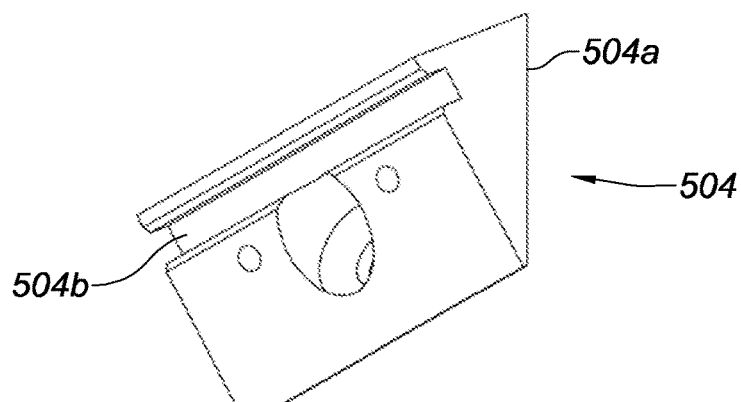
FIGS. 12 and 13 are perspective views of a wedging portion of the connecting member according to the invention and according to the first embodiment.
Figure 13:
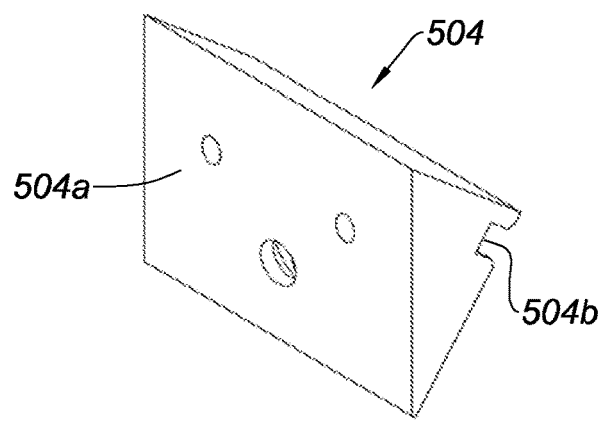

Referring to FIGS. 12 and 13, the wedging portion 504 is optional and is used to enable the change of the inclination of the snow-removal scraper 300 depending on the desired type of scraping, as will be explained below in the description. Hence, the wedging portion 504 comprises an inclined side 504a whose inclination is predetermined according to the scraping needs. Thus, the inclination represented in particular in FIGS. 12 and 13 is not restrictive. The inclined side 504a is configured to be fastened on the snow-removal blade 200.

Furthermore, the wedging portion 504, comprises a groove 504b configured to enable the alignment of said wedging portion 504 during its mounting on the snow-removal blade 200. Once the wedge is properly positioned on the snow-removal blade, it is easy to position the receiving 501, locking 502 and fastening 503 portions.

The snow-removal scraper 300 according to a first embodiment will now be described with reference to FIG. 26. The snow-removal scraper 300 according to a first embodiment is compatible with the connecting member 500 according to a first embodiment represented in FIGS. 3 to 13.

Figure 26:
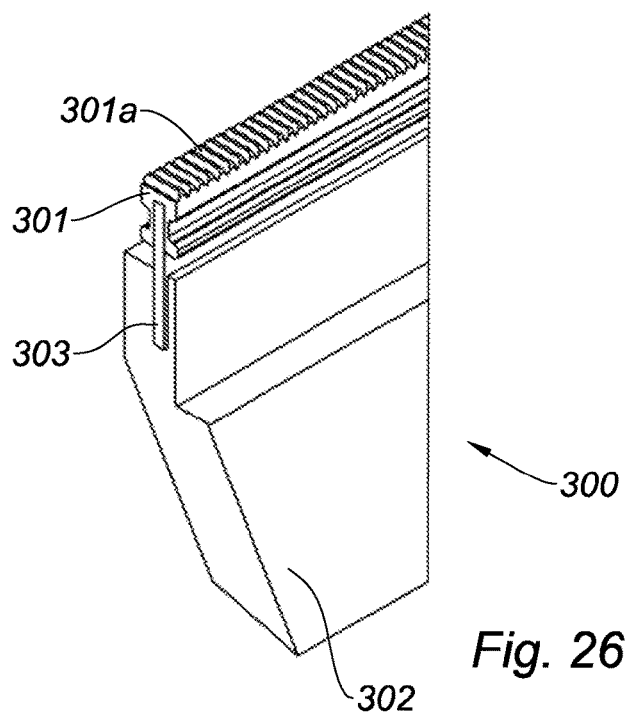
FIG. 26 is a partial perspective view of the snow-removal scraper according to the invention, according to a first embodiment and configured to cooperate with the connecting member according to the first embodiment.

In the example illustrated in FIG. 26, the snow-removal scraper 300 comprises a scraping portion 302 which may have several different shapes depending on the desired type of scraping and for example as illustrated in FIGS. 22 to 25.

Furthermore, the snow-removal scraper 300 includes a fastening portion comprising a complementary connecting member 301. The complementary connecting member 301 is shaped so as to cooperate with the receiving portion 501 of the connecting member 500 according to the first embodiment described herein before.

The complementary connecting member 301 has a cooperation face 301a shaped so as to cooperate with the bearing portion 502b of the locking portion 502. Furthermore, the complementary connecting member 301 has a shape profile complementary to the shape of the housing 501a of the receiving portion 501 of the connecting member 500. In the first embodiment of the snow-removal scraper 300, the complementary connecting member 301 has an H-shaped profile, similar to the hollow shape of the housing 501a of the receiving portion 501.

Figure 14:
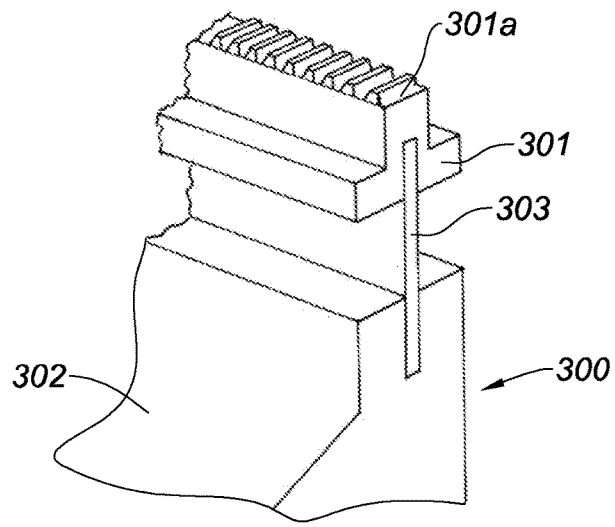
FIG. 14 is a partial perspective view of the snow-removal scraper according to the invention, according to a second embodiment and configured to cooperate with the connecting member according to the second embodiment.

The snow-removal scraper 300 further comprises an insert 303 connecting the fastening portion to the scraping portion 302. In FIG. 14, the insert 303 is straight but it may have several shapes a will be described below with reference to FIGS. 22 to 25.

The snow-removal scraper 300 according to a second embodiment will now be described with reference to FIG. 14. The snow-removal scraper 300 according to a second embodiment is compatible with the connecting member 500 according to a second embodiment and represented in FIGS. 15 to 16.

In the example illustrated in FIG. 14, the snow-removal scraper 300 comprises a scraping portion 302 which may have several different shapes depending on the desired type of scraping and for example as illustrated in FIGS. 22 to 25.

Furthermore, the snow-removal scraper 300 includes a fastening portion comprising a complementary connecting member 301. The complementary connecting member 301 is shaped so as to cooperate with the receiving portion 501 of the connecting member 500 according to the second embodiment described hereinafter.

The complementary connecting member 301 has a cooperation face 301a shaped so as to cooperate with the bearing portion 502b of the locking portion 502. Furthermore, the complementary connecting member 301 has a shape profile complementary to the shape of the housing 501a of the receiving portion 501 of the connecting member 500. In the second embodiment of the snow-removal scraper 300, the complementary connecting member 301 has a reverse T-shaped profile, similar to the hollow shape of the housing 501a of the receiving portion 501.

The snow-removal scraper 300 further comprises an insert 303 connecting the fastening portion to the scraping portion 302. In FIG. 14, the insert 303 is straight but may have several shapes as will be described below with reference to FIGS. 22 to 25.

The connecting member 500 according to a second embodiment will now be described with reference to FIGS. 15 and 16.

Figure 15:
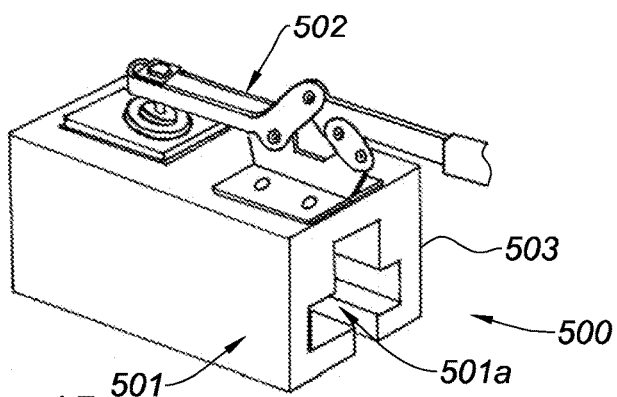
FIG. 15 is a perspective view of the connecting member according to the invention and according to a second embodiment.

Referring to FIG. 15, the connecting member 500 comprises a receiving portion 501 configured to cooperate with the complementary connecting member 301 formed on the snow-removal scraper 300 made according to a first embodiment. The connecting member 500 further comprises a fastening portion 503 contiguous to the receiving portion 501. The connecting member 500 comprises a locking portion 502.

In the second embodiment of the connecting member 500, the locking 502 and receiving 501 portions comprise independent parts fastened to each other so as to form the connecting member 500. Thus, the locking portion 502 is fastened on the receiving portion 501, the fastening portion 503 being formed laterally on the receiving portion 501.

In the second embodiment, no wedging portion is represented. However, the wedging portion 504 represented in the first embodiment may be transposed in this second embodiment of the connecting member 500. Alternatively, the alignment of the connecting member 500 on the snow-removal blade 200 may be carried out thanks to an alignment tool.

Each part 501, 502, 503 of the connecting member 500 according to the second embodiment will now be described in detail with reference to FIGS. 15 and 16.

Referring to FIG. 15, the receiving portion 501 comprises a housing 501a shaped so as to receive at least partially the complementary connecting member 301 of the snow-removal scraper 300. In the example illustrated in FIG. 15, the housing 501a extends longitudinally through the receiving portion 501. The receiving portion 501 further comprises an opening (not shown) formed atop the receiving portion 501 opening into the housing 501a of the receiving portion 501. The opening is shaped so as to receive a bearing portion 502b of the locking portion 502.

The fastening portion 503 is formed on a lateral face of the receiving portion as indicated in FIG. 15. In the second embodiment of the connecting member 500, the fastening portion 503 is configured to be fastened directly on the snow-removal blade 200. The fastening portion 503 comprises at least one fastening orifice.

Figure 16:
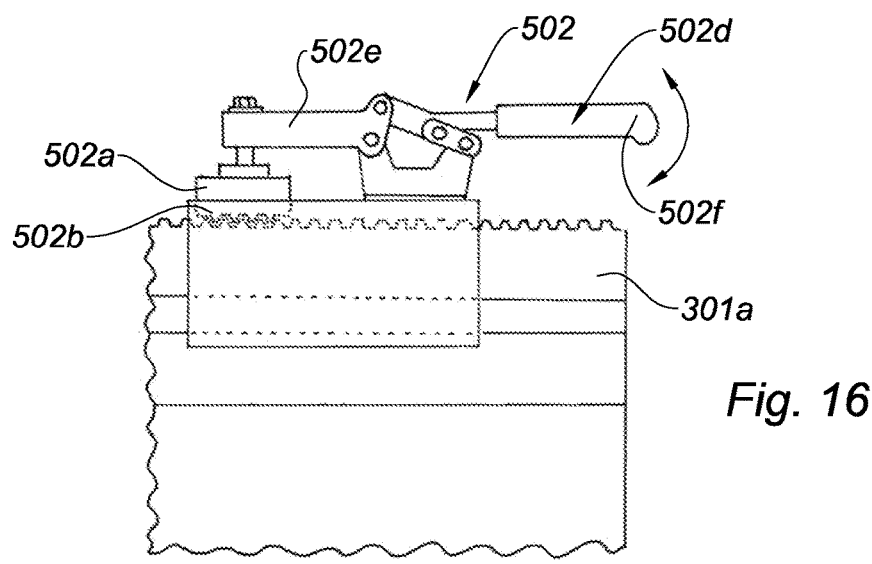
FIG. 16 is a schematic side view of the assembly of the scraper and of the connecting member according to the second embodiment.

Referring to FIGS. 15 and 16, the locking portion 502 of the connecting member 500 comprises a locking element 502a configured to lock the connecting member 500 between the snow-removal scraper 300 and the snow-removal blade 200.

The locking element 502a extends according to an axis substantially perpendicular to the axis along which extends the housing 501a of the receiving portion 501. The locking element 502a is configured to be inserted partially into the housing 501a through the opening of the receiving portion provided to this end, and as illustrated in FIG. 16.

As shown in particular in FIG. 16, the locking element 502a comprises a bearing portion 502b extending at least partially in the receiving portion 501 of the connecting member 500 and more specifically in the housing 501a of the receiving portion 501. The bearing portion 502b is configured to exert a force on the complementary member 301 of the snow-removal scraper in the mounted/locked position so as to block in translation the snow-removal scraper 300.

In the example illustrated in FIG. 16, the bearing portion 502b has a crenelated relief shaped so as to cooperate by form-fitting with the complementary member 301 of the snow-removal scraper 300 in the mounted/locked position.

The locking portion 502 further comprises an actuation portion 502d configured to enable the axial displacement of the bearing portion 502b in order to lock or unlock the connecting member 500.

The actuation portion 502d is connected to the bearing portion 502b by an actuation arm 502e actuated by a sleeve 502f and a plurality of connecting rods as shown in FIG. 16.

A third embodiment of the connecting member 500 will now be described with reference to FIG. 17. In the third embodiment of the connecting member 500, said connecting member 500 comprises a receiving portion 501 configured to cooperate with the complementary connecting member 301 formed on the snow-removal scraper 300. The connecting member 500 further comprises a fastening portion 503 contiguous to the receiving portion 501. The connecting member 500 comprises a locking portion 502.

In the third embodiment of the connecting member 500, the locking 502, receiving 501 and fastening 503 portions are one-piece parts.

Figure 17:
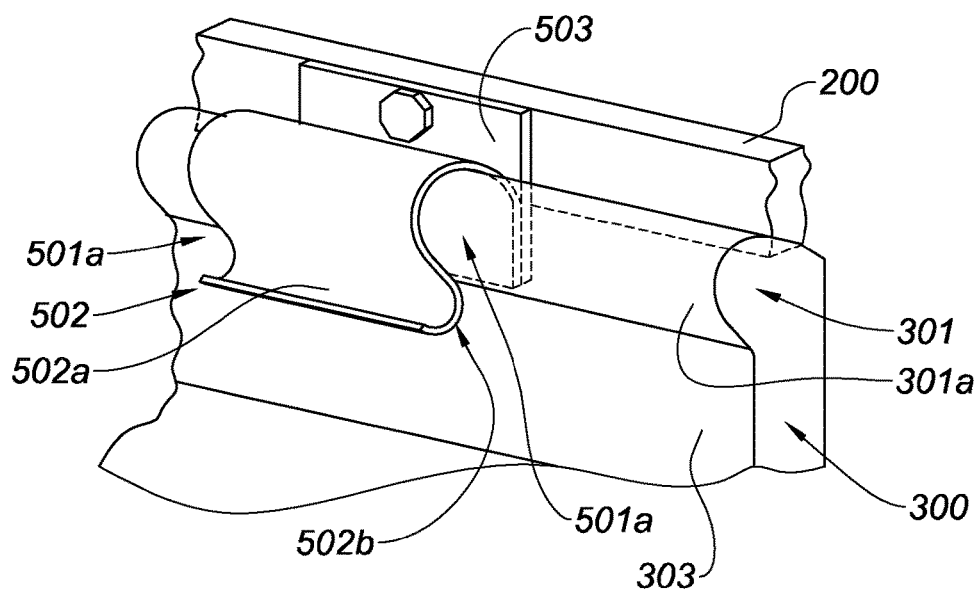
FIG. 17 is a partial perspective view of a connecting device according to the invention comprising a connecting member according to a third embodiment and a snow-removal scraper according to a third embodiment.

The receiving portion 501 comprises a housing 501a shaped so as to receive at least partially the complementary connecting member 301 of the snow-removal scraper 300 according to a second embodiment and illustrated partially in FIG. 17. The housing 501a extends longitudinally through the receiving portion 501. The receiving portion 501 is formed by a portion of the fastening portion 503 and on the other hand by a spring leaf forming the locking portion 502.

In the third embodiment of the connecting member 500, the fastening portion 503 is configured to be fastened directly on the snow-removal blade 200. The fastening portion 503 comprises at least one fastening orifice. The connecting member 500 is configured to be fastened on the snow-removal blade 200, for example by screwing.

Referring to FIG. 17, the locking portion 502 of the connecting member 500 comprises a locking element 502a configured to block the snow-removal scraper 300. The locking element 502a extends according to an axis substantially parallel to the axis along which the housing 501a of the receiving portion 501 extends. More particularly, the locking element 502a is formed by a return of the spring leaf partially forming the receiving portion 501.

The locking element 502a comprises a bearing portion 502b extending at least partially in the receiving portion 501 of the connecting member 500 and more specifically in the housing 501a of the receiving portion 501. The bearing portion 502b is configured to exert a force on the complementary member 301 of the snow-removal scraper in the mounted/locked position so as to block the snow-removal scraper 300 in translation.

In the third embodiment, no wedging portion is represented. However, the wedging portion 504 represented in the first embodiment might be transposed in this third embodiment of the connecting member 500.

The snow-removal scraper 300 made according to a third embodiment is illustrated in FIG. 17. This scraper model is compatible with the connecting member made according to a third embodiment and described in FIG. 17.

The snow-removal scraper 300 according to the third embodiment will now be described with reference to FIG. 17. The snow-removal scraper 300 comprises a scraping portion (not shown) which may have several different shapes depending on the desired type of scraping.

Furthermore, the snow-removal scraper 300 includes a fastening portion comprising a complementary connecting member 301. The complementary connecting member 301 is shaped so as to cooperate with the receiving portion 501 of the connecting member 500 according to the third embodiment described herein before.

The complementary connecting member 301 has a cooperation face 301a shaped so as to cooperate with the bearing portion 502a of the locking portion 502. Furthermore, the complementary connecting member 301 has a shape profile complementary to the shape of the housing 501a of the receiving portion 501 of the connecting member 500. In the third embodiment of the snow-removal scraper 300, the complementary connecting member 301 has a rounded shaped profile.

The snow-removal scraper 300 further comprises an intermediate portion 303 connecting the fastening portion to the scraping portion. In FIG. 17, the intermediate portion 303 is straight but may have several shapes as will be described later on with reference to FIGS. 22 to 25.

The connecting member 500 according to the invention and according to a fourth embodiment will now be described with reference to FIG. 18.

The connecting member 500 comprises a receiving portion 501 configured to cooperate with the complementary connecting member 301 formed on the snow-removal scraper 300 made according to a fourth embodiment represented in FIG. 18 and described hereinafter. The connecting member 500 further comprises a fastening portion 503 comprising a housing configured to receive at least one portion of the receiving portion 501 there within. The connecting member 500 comprises a locking portion 502 made in the form of a bar and configured to maintain the cooperation of the receiving portion 501 with the complementary connecting member 301.

In the fourth embodiment of the connecting member 500, the locking 502, fastening 503 and receiving 501 portions comprise parts attached and fitted into each other at least partially so as to form the connecting member 500.

In the fourth embodiment, no wedging portion is represented. However, the wedging portion 504 represented in the first embodiment might be transposed in this fourth embodiment of the connecting member 500. Alternatively, the alignment of the connecting member 500 on the snow-removal blade 200 may be carried out thanks to an alignment tool.

The receiving portion 501 comprises a plurality of lugs 501e which may be in the form of a stud or a threaded rod or other. The plurality of lugs 501e is configured to cooperate with the complementary connecting member 301.

Advantageously, each lug 501e is shaped so as to be housed in a space formed in the relief of the complementary connecting member 301.

According to a feature of the invention, the lugs 501e are evenly spaced on the receiving portion 501.

Figure 18:
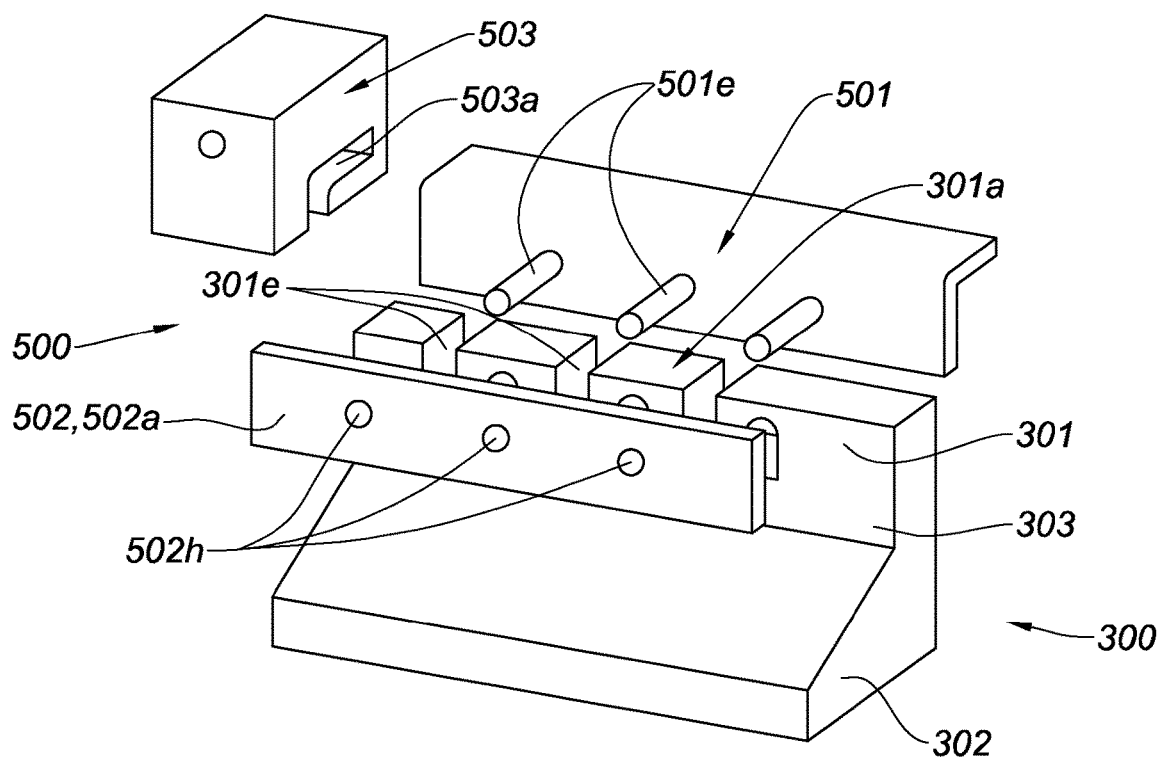
FIG. 18 is a partial exploded perspective view of a connecting device according to the invention comprising a connecting member according to a fourth embodiment and a snow-removal scraper according to a fourth embodiment.

As shown in FIG. 18, the fastening portion 503 comprises a part independent of the receiving portion 501 and comprising a housing 503a. The housing 503a of the fastening portion 503 is shaped so as to receive a portion of the receiving portion 501 there within.

In the fourth embodiment of the connecting member 500, the fastening portion 503 is configured to be fastened directly on the snow-removal blade 200. The fastening portion 503 comprises on one of its faces at least one fastening orifice (not shown in FIG. 18). The connecting member 500 is configured to be fastened on the snow-removal blade 200, for example by screwing.

The locking portion 502 of the connecting member 500 comprises a locking element 502a in the form of a bar configured to block the connecting member 500 and the position of the snow-removal scraper 300 with respect to the snow-removal blade 200. More specifically, the locking element 502a is pressed laterally against a side of the complementary connecting member of the snow-removal scraper 300. The locking portion 502 further comprises a plurality of orifices for fastening said portion on the complementary connecting member 301.

The snow-removal scraper 300 according to a fourth embodiment will now be described with reference to FIG. 18. The snow-removal scraper 300 according to the fourth embodiment is compatible with the connecting member 500 according to the fourth embodiment shown in FIG. 18.

In the example illustrated in FIG. 18, the snow-removal scraper 300 comprises a scraping portion 302 which may have several different shapes depending on the desired type of scraping and as illustrated in particular in FIGS. 22 to 25.

Furthermore, the snow-removal scraper 300 includes a fastening portion comprising a complementary connecting member 301. The complementary connecting member 301 is shaped so as to cooperate with the receiving portion 501 of the connecting member 500 according to the fourth embodiment described hereinabove.

The complementary connecting member 301 has a buttonhole shape having a plurality of housings 301e each shaped so as to receive a lug 501e of the receiving portion 501 of the connecting member 500 according to the fourth embodiment.

The snow-removal scraper 300 further comprises an insert or intermediate portion 303 connecting the fastening portion to the scraping portion 302. In FIG. 18, the profile of the intermediate portion 303 is straight but may have several shapes as will be described below with reference to FIGS. 22 to 25.

The connecting member 500 according to the invention and according to a fifth embodiment will now be described with reference to FIGS. 20 to 21.

Figure 20:
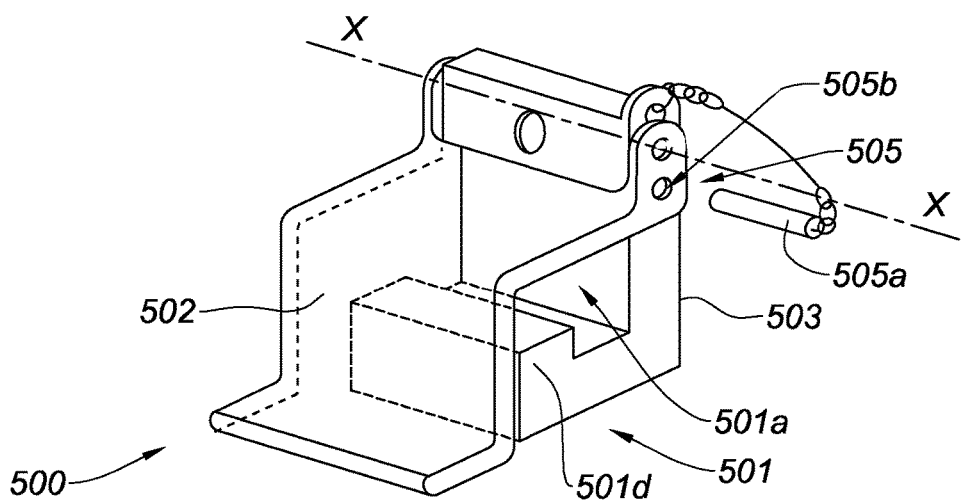
FIG. 20 is a perspective view of a connecting member according to the invention and according to a fifth embodiment.
Figure 21:
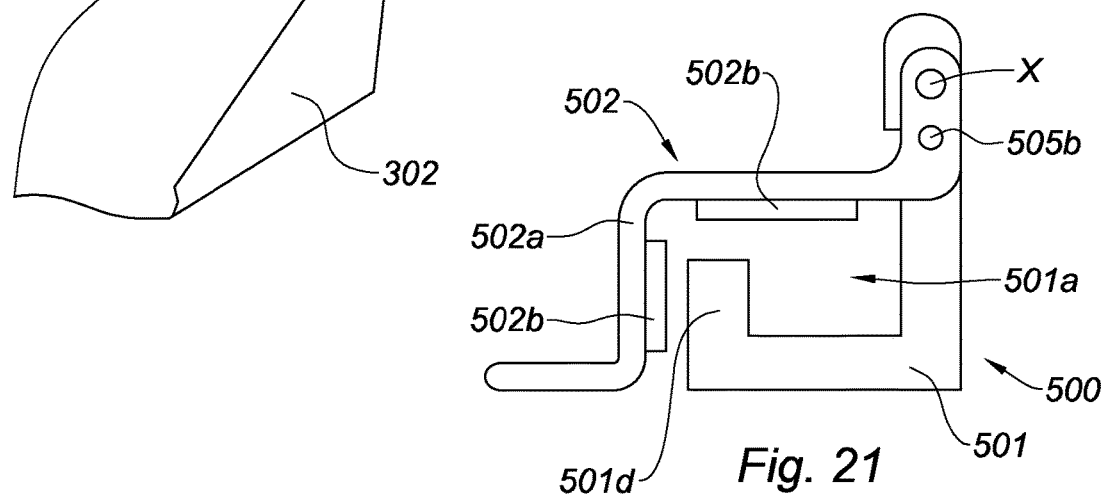
FIG. 21 is a side view of the connecting member represented in FIG. 20.

Referring to FIGS. 20 and 21, the connecting member 500 comprises a receiving portion 501 configured to cooperate with the complementary connecting member 301 formed on the snow-removal scraper 300 made according to a fifth embodiment shown in FIG. 19 and described hereinafter. The connecting member 500 further comprises a fastening portion 503 contiguous to the receiving portion 501. The connecting member 500 comprises a locking portion 502.

In the fifth embodiment of the connecting member 500, the locking 502 and receiving 501 portions comprise parts attached and fastened to each other so as to form the connecting member 500. Thus, the locking portion 502 is rotatably mounted on the receiving portion 501 according to the axis X-X. The fastening portion 503 formed on the receiving portion 501 on the side opposite to the locking portion 502.

In the fifth embodiment, no wedging portion is represented. However, the wedging portion 504 shown in the first embodiment may be transposed in this fifth embodiment of the connecting member 500. Alternatively, the alignment of the connecting member 500 on the snow-removal blade 200 may be achieved thanks to an alignment tool.

The receiving portion 501 comprises an open housing 501a shaped so as to receive at least partially the complementary connecting member 301 of the snow-removal scraper 300. In the example illustrated in FIGS. 20 and 21, the housing 501a extends longitudinally through the receiving portion 501. The receiving portion 501 further comprises a protruding portion 501d orientated inwardly of the housing 501a and configured to maintain the connecting member 500 assembled with the snow-removal scraper 300 made according to the fifth embodiment.

As shown in FIG. 21, the fastening portion 503 is formed on one face of the receiving portion 501. In the fifth embodiment of the connecting member 500, the fastening portion 503 is configured to be fastened on the snow-removal blade 200. The fastening portion 503 comprises at least one fastening orifice. The connecting member 500 is configured to be fastened directly on the snow-removal blade 200, for example by screwing.

Referring to FIGS. 20 and 21, the locking portion 502 of the connecting member 500 comprises a locking element 502a configured to lock the connecting member 500 between the snow-removal scraper 300 and the snow-removal blade 200.

In the dismounted position, the locking portion 502 closes the housing 501a of the receiving portion 501.

Furthermore, the locking element 502a comprises two bearing portions 502b extending at least partially in the receiving portion 501 of the connecting member 500 and more specifically in the housing 501a of the receiving portion 501. Each bearing portion 502b comprises a protruding portion forming a fin configured to cooperate with a complementary relief formed on the complementary member 301 of the snow-removal scraper and a planar portion corresponding to a portion of the inner surface of the locking element 502a configured to exert a force on the complementary member 301 of the snow-removal scraper 300 in the mounted/locked position.

As illustrated in particular in FIG. 20, the connecting member 500 according to the fifth embodiment comprises a safety member 505 comprising a pin 505a configured to be housed in an orifice 505b formed beneath the axis of rotation X-X of the locking portion 502. The pin 505a is configured to block the rotation of the locking portion 502 relative to the receiving portion 501.

The snow-removal scraper 300 according to a fifth embodiment will now be described with reference to FIG. 19. The snow-removal scraper 300 according to the fifth embodiment is compatible with the connecting member 500 according to the fifth embodiment and represented in FIGS. 20 and 21.

Figure 19:
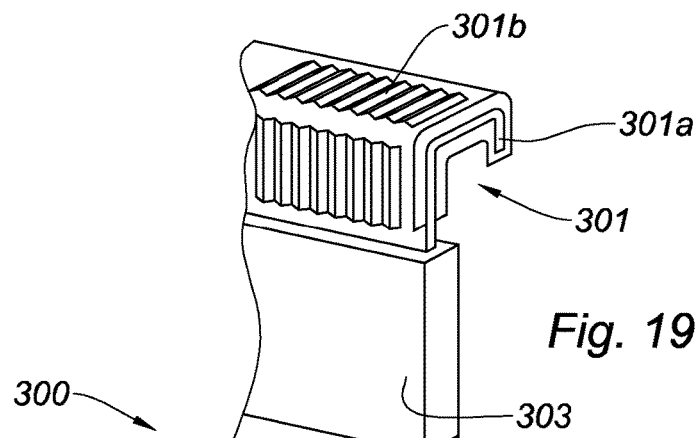
FIG. 19 is a partial perspective view of the snow-removal scraper according to the invention and according to a fifth embodiment, configured to cooperate with the connecting member according to the fifth embodiment.

In the example illustrated in FIG. 19, the snow-removal scraper 300 comprises a scraping portion 302 which may have several different shapes depending on the desired type of scraping.

Furthermore, the snow-removal scraper 300 includes a fastening portion comprising a complementary connecting member 301. The complementary connecting member 301 is shaped so as to cooperate with the receiving portion 501 of the connecting member 500 according to the fifth embodiment described hereinbefore.

The complementary connecting member 301 has a cooperation face 301a shaped so as to cooperate with the bearing portion 502b of the locking portion 502. Furthermore, the complementary connecting member 301 has a shape profile complementary to the shape of the housing 501a of the receiving portion 501 of the connecting member 500. In the fifth embodiment of the snow-removal scraper 300, the complementary connecting member 301 has a reverse J-shaped profile, similar to the hollow shape of the housing 501a of the receiving portion 501.

The snow-removal scraper 300 further comprises an insert or intermediate portion 303 connecting the fastening portion to the scraping portion 302. In FIG. 19, the profile of the intermediate portion 303 is straight but may have several shapes as will be described later on with reference to FIGS. 22 to 25.

Regardless of the embodiment of the snow-removal scraper, the complementary connecting member is overmolded on the intermediate portion or the insert, and the scraping portion, which is a wear portion, is also overmolded on the intermediate portion or insert.

FIGS. 22 to 25 show configurations of snow-removal scraper 300 which can apply to any snow-removal scraper 300 of any of the embodiments previously described.

Figure 22:
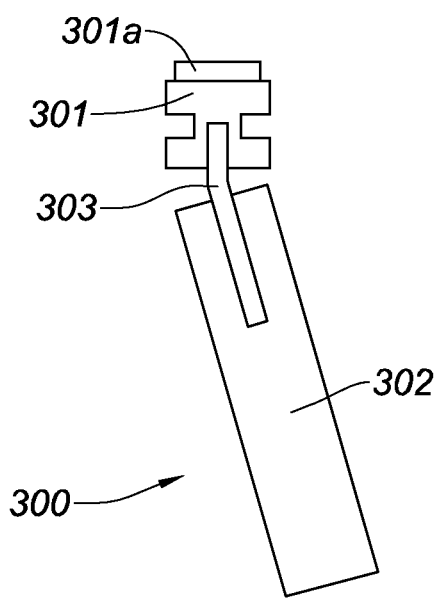
FIG. 22 is a schematic side view of a snow-removal scraper according to the invention and regardless of the embodiment of the snow-removal scraper and of the connecting member, according to a first configuration.

The first configuration shown in FIG. 22 is a negative snow-removal scraper configuration with an insert or intermediate portion having an angulation, preferably by about 22.5°.

In the present application, negative snow-removal scraper will be understood a snow-removal scraper which pushes the snow by bending of the scraping portion.

Figure 23:
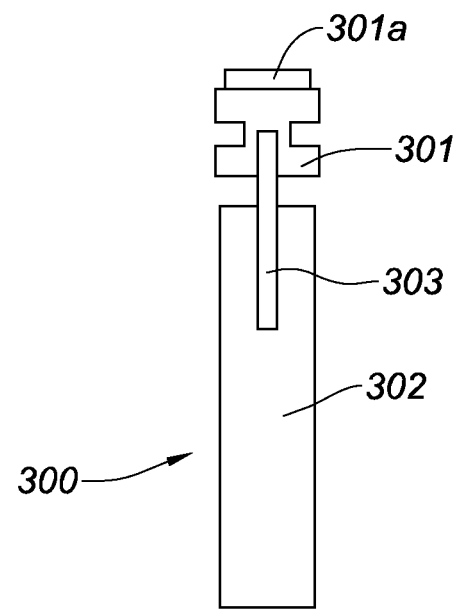
FIG. 23 is a schematic side view of a snow-removal scraper according to the invention and regardless of the embodiment of the snow-removal scraper and of the connecting member, according to a second configuration.

The second configuration shown in FIG. 23 is a negative snow-removal scraper configuration without any particular angulation.

Figure 24:
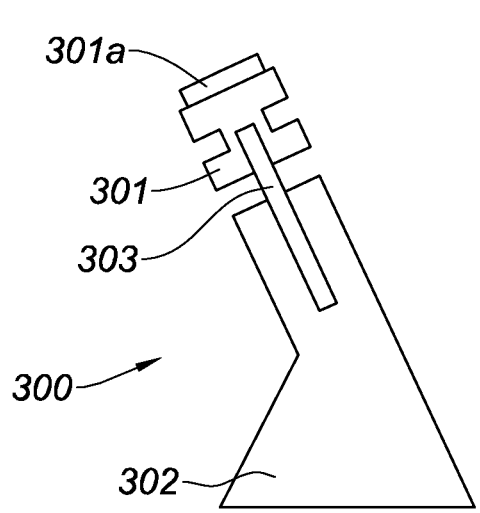
FIG. 24 is a schematic side view of a snow-removal scraper according to the invention and regardless of the embodiment of the snow-removal scraper and of the connecting member, according to a third configuration.

The third configuration shown in FIG. 24 is a positive snow-removal scraper configuration.

In the present application, positive snow-removal scraper will be understood a snow-removal scraper having an angle of attack on the scraping portion and allowing raising the snow over the blade and evacuating it on the sides of the snow-removal machine, during scraping.

Figure 25:
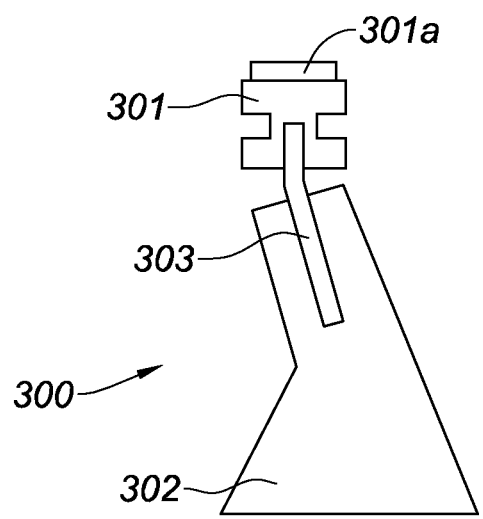
FIG. 25 is a schematic side view of a snow-removal scraper according to the invention and regardless of the embodiment of the snow-removal scraper and of the connecting member, according to a fourth configuration.

The fourth configuration shown in FIG. 25 is a positive snow-removal scraper configuration with an insert or intermediate portion having an angulation, preferably by about 22.5°.

Of course, the angulation by 22.5° of the second and fourth configurations is an example of the angle, which is not limited to this specific example.

Of course, the invention can also apply to any other set equipped with a scraper and regardless of the support on which the scraper is fastened. For example, this invention can apply to conveyor belts of quarries.

Of course, the invention is not limited to the embodiments described and shown in the appended figures. Modifications remain possible, in particular with regard to the constitution of the various elements or by substitution with technical equivalents, without departing from the scope of the invention.

The invention claimed is:

1. A connecting member for a snow-removal set, said snow-removal set comprising a snow-removal blade and a snow-removal scraper, said connecting member being configured to be fastened to the snow-removal blade and to cooperate with the snow-removal scraper, said connecting member comprising:
    a fastening portion configured to be fastened directly or indirectly on the snow-removal blade,
    a receiving portion configured to cooperate with a complementary connecting member formed on the snow-removal scraper; and
    a locking portion comprising a locking element configured to lock the connecting member between the snow-removal scraper and the snow-removal blade;
    wherein the locking element comprises a bearing portion extending in the receiving portion; and
    wherein said bearing portion is configured to exert a force on the complementary member of the snow-removal scraper in a mounted locked position.

2. The connecting member according to claim 1, wherein the bearing portion is shaped so as to cooperate by form-fitting with the complementary connecting member of the snow-removal scraper in the mounted locked position.

3. The connecting member according to claim 1, wherein the locking element comprises an actuation portion configured to enable an axial displacement of the bearing portion in order to lock or unlock the connecting member.

4. The connecting member according to claim 1, wherein the receiving portion comprises a housing shaped so as to receive the complementary connecting member of the snow-removal scraper in the mounted locked position or in a mounted unlocked position.

5. A snow-removal scraper for a snow-removal set, the snow-removal scraper comprising:
    a scraping portion,
    a fastening portion, the fastening portion comprising a complementary connecting member shaped so as to cooperate with the receiving portion of the connecting member according to claim 1, the complementary connecting member comprising a cooperation face shaped so as to cooperate with the bearing portion of the locking portion of the connecting member, in the mounted locked position.

6. A device for connecting a snow-removal scraper to a snow-removal blade of a snow-removal set, the connecting device comprising:
    a connecting member according to claim 1, said connecting member being configured to be fastened to the snow-removal blade of the snow-removal set, said connecting member comprising a fastening portion configured to be fastened directly or indirectly on the snow-removal blade,
    a complementary connecting member configured to be formed on the snow-removal scraper of the snow-removal set,
    said connecting member comprising a receiving portion shaped so as to cooperate with a portion of the complementary connecting member so that the snow-removal blade and the snow-removal scraper are mechanically connected to each other.

7. A snow-removal set, comprising:
    a snow-removal blade,
    a snow-removal scraper according to claim 5,
    a device for connecting the snow-removal scraper to the snow-removal blade of the snow-removal set, the connecting device comprising:
    a connecting member said connecting member being configured to be fastened to the snow-removal blade of the snow-removal set, said connecting member comprising a fastening portion configured to be fastened directly or indirectly on the snow-removal blade, a complementary connecting member formed on the snow-removal scraper of the snow-removal set, said connecting member comprising a receiving portion shaped so as to cooperate with a portion of the complementary connecting member so that the snow-removal blade and the snow-removal scraper are mechanically connected to each other, the connecting device being configured to releasably connect the snow-removal scraper to the snow-removal blade and to be positioned between the snow-removal blade and the snow-removal scraper.

* * * * *